United States Patent [19]
Atkinson

[11] Patent Number: 5,305,647
[45] Date of Patent: Apr. 26, 1994

[54] COUNTER ASSEMBLY FOR GAS METER
[75] Inventor: Albert B. Atkinson, Houston, Tex.
[73] Assignee: Dresser Industries, Inc., Dallas, Tex.
[21] Appl. No.: 890,745
[22] Filed: May 28, 1992
[51] Int. Cl.⁵ .................................... G01F 15/02
[52] U.S. Cl. .............................. 73/861.01; 73/233
[58] Field of Search ............... 73/233, 861.01; 235/94 R; 16/2

[56] References Cited
U.S. PATENT DOCUMENTS

| | | | |
|---|---|---|---|
| 2,059,547 | 11/1936 | Brandl | 73/233 |
| 2,093,151 | 9/1937 | MacLean | 73/233 |
| 2,438,935 | 4/1948 | Marsh | 73/233 |
| 2,791,118 | 5/1957 | Holtz | 73/233 |
| 3,581,566 | 6/1971 | Randall | 73/229 |
| 3,969,939 | 7/1976 | Grzeslo | 73/194 M |
| 4,111,042 | 9/1978 | Bryant | 73/194 M |

Primary Examiner—Richard E. Chilcot, Jr.
Assistant Examiner—Harshad Patel

[57] ABSTRACT

A fluid meter counter assembly includes a one-way clutch with an input hub drivingly releasable and connectable to a clutch shaft for unidirectional rotation of the clutch shaft and, in turn, a register in response to a reciprocating force coupled eccentrically to the input hub from outside of its rotational plane. A tubular support fixedly connected to the input hub extends along the clutch shaft and includes a distal end with an integral reaction surface spaced from the rotational plane of the hub and in bearing engagement with the outside of the clutch shaft to react against tilting of the hub within its rotational plane and binding relative to the clutch shaft under side load.

4 Claims, 2 Drawing Sheets

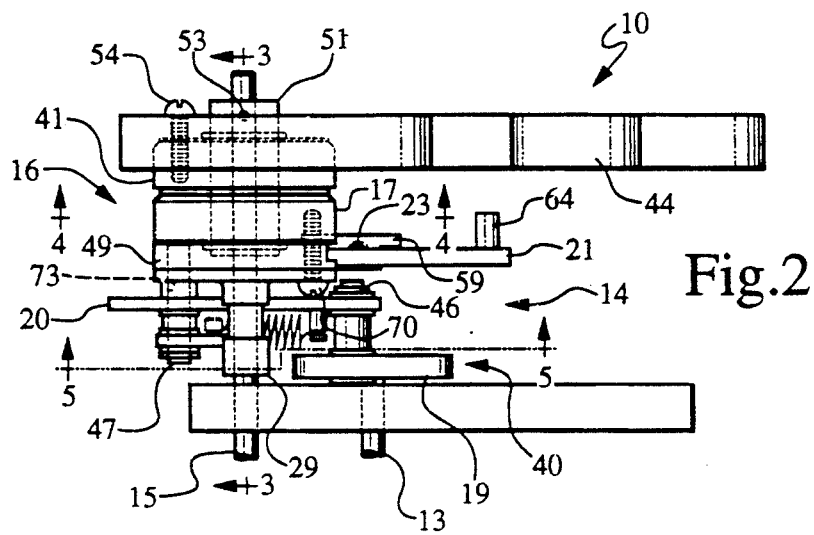
Fig.2
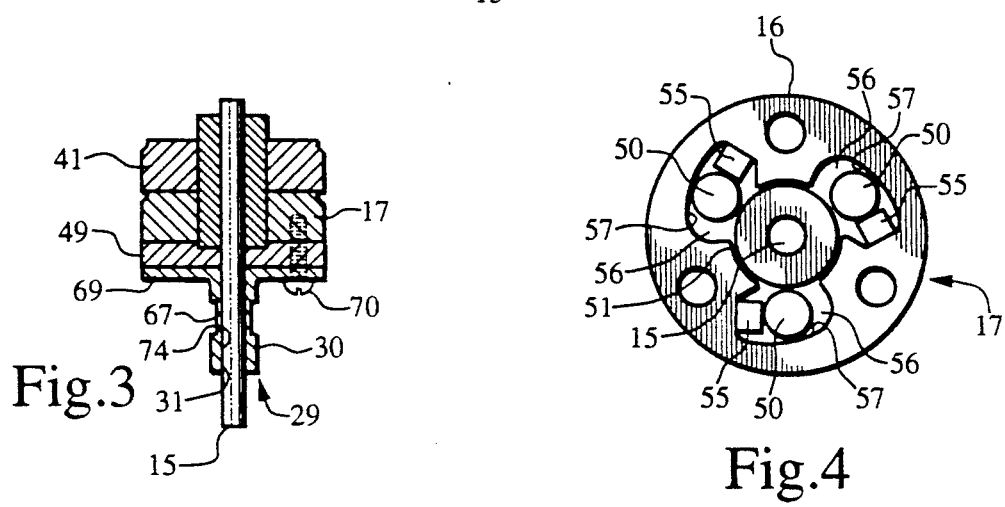
Fig.3
Fig.4
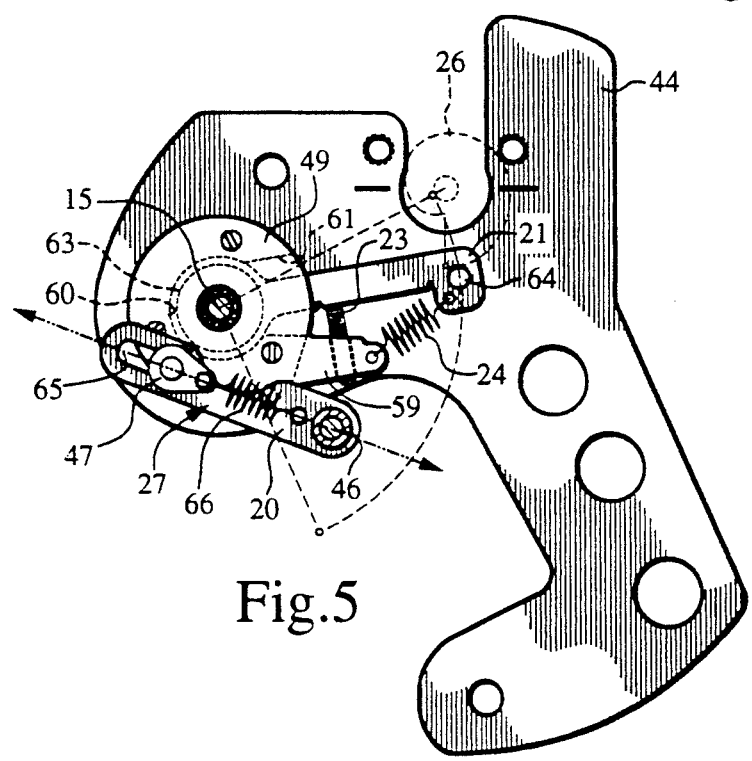
Fig.5

COUNTER ASSEMBLY FOR GAS METER

BACKGROUND OF THE INVENTION

1. Technical Field

This invention relates to a counter assembly for use in conjunction with a fluid meter to provide flow volume information corrected to a standard. In particular, the invention is concerned with an improvement in the arrangement for mounting a clutch on an output shaft connected between a mechanical computer utilized in correcting a measure of actual flow and a register providing corrected flow volume information.

2. Background Information

Gas meters include counters with mechanical computers for correcting a measured volume of gas which flows through the meter to accommodate for volumetric differences from a standard volume at a standard set of conditions. One form of prior meter counter including a mechanical computer for making corrections due to the temperature differences from a standard temperature is disclosed in U.S. Pat. No. 3,581,566. As disclosed in that patent, a compensating device includes a temperature sensitive transducer including a cam which serves to limit travel of the end of a driven arm. A one-way clutch translates arcuate advance and return strokes of the driven arm into rotation of an output shaft which, in turn, is connected to a meter register. The driven arm is moved by an eccentric mechanism which is connected to a shaft rotated in proportion to the actual volume of flow through the meter. The position of the cam and hence the travel of the driven arm is variable dependent upon temperature. Within the mechanism connecting the driven arm to the meter is an overtravel spring which acts between parts of the mechanism to provide for relative differences in travel between the corrected rotational output and the uncorrected rotational input when the driven arm engages the temperature cam. During overtravel, the overtravel spring functions to return parts to an initial setting, acting at least partially against an input hub of the clutch to maintain contact of the driven arm against the cam and to maintain disengagement of the input hub from the output shaft of the mechanical computer except when the driven arm is moved away from the cam. Thus, the driven arm acting through the one-way clutch produces a temperature corrected rotational output from an uncorrected rotational input.

Space limitations in meter counters may dictate that an input hub of the one-way clutch be drivingly connected to the output shaft and loaded from the side, that is to say from outside of the plane of rotation of the input hub. With clutches which utilize spring biased rollers for one-way gripping, this side loading can sometimes cause the hub to twist and the rollers to bind and possibly stick between the hub and the output shaft. As a result, the hub will not free wheel relative to the output shaft and return to its start position. This results in the introduction of measurement inaccuracies into the output of the mechanical computer.

In prior meter counters which utilize an overtravel spring between parts of the counter to provide for relative differences in travel between corrected rotational output and uncorrected rotational input, a stronger overtravel spring may be utilized to overcome clutch binding. However, the strength of the overtravel spring has a direct effect on the drag of the meter rotor, the stronger the spring the greater the drag, and an attendant reduction in the accuracy of the measured volume of flow through the meter particularly at low volume flow rates.

SUMMARY OF THE INVENTION

The primary aim of the present invention is to provide a new and improved counter for a fluid meter and, in particular a counter within which the one-way clutch is kept from binding under the application of a side load. Specifically, the invention resides in the provision of a particularly simple and inexpensive manner of mounting the input hub of the clutch on the output shaft of the counter to compensate for side loading and thereby virtually eliminate the problem of clutch binding on the return stroke of the computer arm. Advantageously, the novel manner of mounting the input hub of the clutch reduces the need for a stronger overtravel spring so as to reduce drag on the meter rotor and increase the accuracy of the counter at low rates of flow through the meter.

In carrying out the present invention, a unique tubular support is attached to one side of the input hub and extends along the output shaft of the counter so that a distal end of the support is positioned in bearing engagement with the shaft to keep the input hub from twisting relative to the shaft.

The foregoing and other advantages of the present invention will become more apparent from the following description of the preferred embodiment when taken in conjunction with the accompanying drawings.

BRIEF DESCRIPTION OF THE DRAWING

FIG. 2 is an elevational view of a portion the counter taken substantially along the line 2—2 in FIG. 1.

FIG. 3 is an enlarged view taken substantially along the line 3—3 shown in FIG. 2.

FIG. 4 is an enlarged view taken substantially along line 4—4 of FIG. 2 but with parts removed for clarity of illustration.

FIG. 5 is an enlarged view taken substantially along line 5—5 of FIG. 2 showing in dotted line relative moved positions of parts of the counter.

BEST MODE FOR CARRYING OUT THE INVENTION

Figure 1:
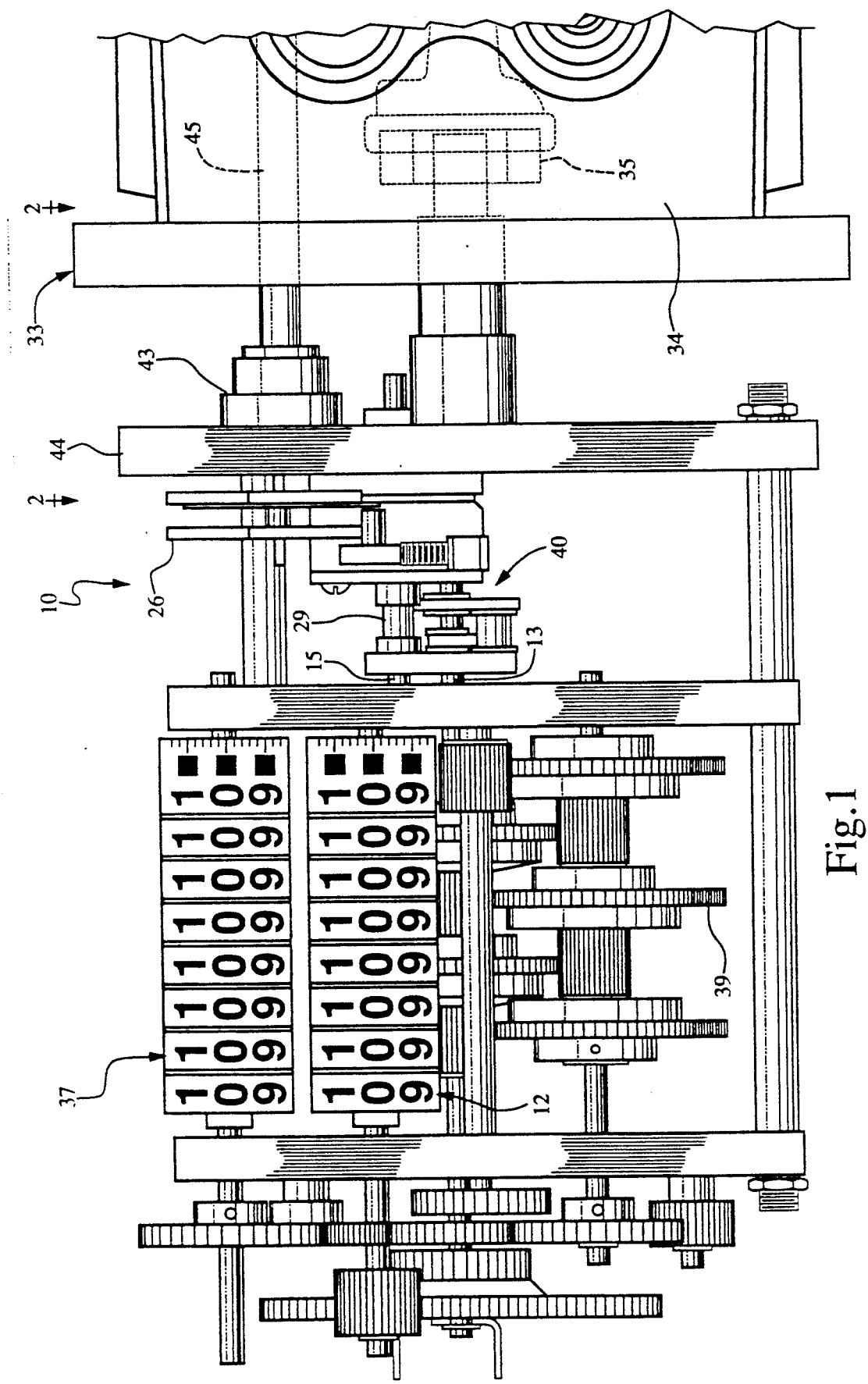
FIG. 1 is a plan view of the internal parts of a meter counter incorporating the novel features of the present invention.

As shown in the drawings for purposes of illustration, the present invention is embodied in a counter assembly 10 such as may be used in conjunction with a gas meter 33 to adjust the measurement of the actual volume of gas flowing through the meter to a standard volume measurement corrected to standard conditions, i.e. temperature and pressure. Connection to the meter 33 is shown generally in FIG. 1 with the counter assembly 10 attached to an end cover 34. Within the meter, two multi-lobe rotors (not shown) are rotated in opposite directions as gas flows through. The rotation of mating lobes of the rotors measures the actual volume of gas flowing through the meter. The counter assembly counts the number of rotations of the rotors and thereby provides a measurement of the amount of gas flowing through the meter.

Drive connection of the meter 33 to the counter assembly 10 is provided by a magnetic coupling 35 which connects an output shaft (not shown) of the meter to an input shaft (not shown) of the counter 10. Within the exemplary counter are two registers 12 and 37 driven by a gear train 39 connected to the input shaft. The register 37 provides an uncorrected reading of the actual volume of gas which has passed through the meter while the register 12 provides a reading corrected to a standard temperature volume.

To correct for variations in gas volume due to temperature, the counter assembly 10 includes a computer mechanism 14 (see FIG. 2) operable to adjust the measured volume rotation of the input shaft to a standard volume rotation of a clutch shaft 15 which drives the register 12. More specifically herein, this is achieved through a four-bar linkage system 40 connected between a computer input crank shaft 13 driven by the gear train 39 and the clutch shaft 15. A one-way clutch unit 16 on the clutch shaft 15 is oscillated clockwise and counterclockwise by the linkage system. As shown in FIGS. 2 and 5, an input hub 17 of the clutch is connected to the linkage system and, when rotated in a clockwise direction by an advance stroke of the linkage system functions to grip the clutch shaft 15 also driving it in a clockwise direction. Upon the return stroke of the linkage system, the input hub releases from the clutch shaft, returning to a starting position while a rear hub 41 of the clutch holds the clutch shaft 15 against rotation.

Adjustment for temperature is achieved by limiting the amount of clockwise rotation of the input hub 17 in response to a sensed temperature. For this purpose, a temperature sensitive transducer 43 (see FIG. 1) is mounted on a support plate 44 adjacent the clutch unit 16 and includes a cam 26 which functions as a condition responsive stop to limit travel of the end of a computer arm 21 connected to the clutch input hub. The position of the cam and hence the travel of the computer arm is variable dependent upon the temperature of the gas flowing through the meter. Measuring the temperature of the gas is a bimetal probe 45 which is connected to the cam and protrudes into the meter. As shown in FIG. 5, the position of the surface of the cam 26 in the arc of travel of the oscillating computer arm serves to limit travel of the arm.

Within the linkage system 40 is an overtravel spring-biased connection 27 which provides for relative differences in travel between the corrected rotational output of the counter 10 and the uncorrected rotational input from the meter 33 when the computer arm 21 engages the temperature cam 26. During overtravel, the overtravel spring-biased connection 27 functions to return parts to an initial setting, acting at least partially against the input hub 17 to maintain contact of the driven arm against the cam and to maintain disengagement of the input hub from the clutch shaft 15 except when the computer arm 21 is moved away from the cam. Thus, the computer arm acting through the one-way clutch produces a temperature corrected rotational output from an uncorrected rotational input.

With reference more specifically to the four-bar linkage system 40 for rotating the input hub 17, the computer input crank shaft 13 has a crank 19 mounted thereon and connected by way of a link 20 (see FIGS. 2 and 5) to the input hub 17. Specifically, a crank pin 46 is connected rotatably and positively between one end of the link and the crank 19. Connected drivingly between the other end of the link and the input hub 17 is a rocker pin 47. The latter is connected eccentrically relative to the input hub so that when the link is reciprocated (indicated by the doubled-ended arrow in FIG. 5), the input hub reciprocates arcuately. Connection of the rocker pin 47 to the input hub is through a rocker plate 49 which is bolted to the face of the input hub. Herein, the crank 19 is rotated by the crank shaft 13 continuously in a clockwise direction. When the link advances from its extreme right position generally to the left as shown in FIG. 5, the rocker plate and the input hub are rotated through a clockwise arc of approximately ninety degrees (90°).

Connecting the input hub 17 to the clutch shaft 15 are one-way rollers 50 (see FIG. 4) so that as the input hub is rotated clockwise, the clutch shaft 15 also is rotated clockwise. Specifically, the input clutch hub 17 is mounted for one-way rotation relative to one end of a clutch sleeve 51 (see also FIG. 2) which is telescoped onto the output shaft and secured thereto against rotation by a locking pin 53 at the opposite end of the sleeve. The clutch sleeve thus becomes effectively part of the clutch shaft. Adjacent the locking pin is the rear clutch hub 41 which is secured to the support plate 44 with mounting screws 54. As shown by way of example in FIG. 4, each of the clutch hubs 17 and 41 have three rollers 50 and leaf springs 55 mounted within tapered wall cavities 56. Generally, if a clutch hub is turned in one direction it will roll freely around the clutch sleeve 51. When rotated in the opposite direction, a wedging action occurs with the clutch rollers being wedged between the clutch sleeve and tapered walls 57 of the cavities 56. This wedging action makes it possible for the input clutch hub 17 to impart rotation to the clutch sleeve 51 and, in turn, the clutch shaft 15.

For the input hub 17 shown in FIG. 4, walls 57 of the cavities 56 are tapered radially inwardly upon progressing in a counterclockwise direction. Thus, when a clockwise motion (as viewed in FIGS. 4 and 5) is imparted to the input clutch hub 17, the rollers 50 lock the clutch sleeve 51 and input hub together, imparting clockwise motion, only, to the clutch shaft 15 through the pin 53. The rear clutch 41 is designed with the walls of the cavities tapered in the opposite direction as the tapering of the walls in the input hub so that when the clutch sleeve 51 turns clockwise there is no wedging of the rollers between the sleeve and the rear clutch hub. Accordingly, the input hub 17 is allowed to turn freely clockwise.

When rotating the input hub 17 in a counterclockwise direction, the input hub rollers 50 should roll freely because there is no wedging action of the tapered walls 57 against the rollers. It is assured that there is no counterclockwise motion of the clutch sleeve 51 because of the reverse direction tapering of the walls of the cavities in the input hub. If counterclockwise motion of the clutch sleeve should tend to occur (say from friction imparted by the rolling front clutch rollers 50) the rear rollers will be wedged between the clutch sleeve 51 and the rear clutch hub 41. This wedging is similar to that as described above for the rollers 50 in the input hub. This counterclockwise wedging action between the rollers in the rear clutch hub and the clutch sleeve insures that there is no movement of the clutch sleeve, rear clutch rollers, rear clutch hub and clutch shaft 15 during counterclockwise rotation of the input hub. Hence, the input clutch hub 17 drives the clutch shaft 15 only when turned in the clockwise direction and the output shaft is motionless when the input hub is turned counterclockwise.

As previously mentioned, in the exemplary embodiment of the present invention, the input clutch hub 17 is operated reciprocally (clockwise then counterclockwise about ninety degrees (90°)) by the four-bar linkage system 40. When the rocker plate 49 is rotated in a counterclockwise direction, the computer arm 21 is also forced in a counterclockwise direction. Carrying the computer arm with the rocker plate is adjustable screw stop 23 secured to a generally tangentially extending leg 59 of the plate. The stop 23 abuts an undersurface of the computer arm 21 adjacent the free end thereof to provide selected angular positioning of the computer arm on the rocker plate. A spring 24 connecting between the ends of the arm and leg urges the two together so that the computer arm and rocker plate function as a unitary member. At an inner end of the computer arm, a socket 60 (see FIG. 5) is formed in the rocker plate including an angular notch 61 extending generally radially outward from the center of the plate. An inner end 63 of the computer arm is nested in the socket with the arm extending generally radially outward through the notch for angular adjustment relative to the plate by the adjustable screw stop 23 being limited angularly by engagement with the sides of the notch.

As shown in FIG. 5, movement of the rocker plate 49 and computer arm 21 in a counterclockwise direction is limited by engagement of a knob 64 on the free end of the computer arm with the temperature compensating cam 26. When this occurs, further rotation of the rocker plate and the computer arm is stopped even though there may be additional travel left in the link 20. To compensate for this difference in travel, the overtravel spring-biased connection 27 includes a slot 65 formed in the link at the rocker pin 47. A return spring 66 connected between the rocker pin and link urges the pin to a right-hand end of the slot (as viewed in FIG. 5). As a result, when the link moves to the right, the rocker plate and computer arm rotate counterclockwise until the computer arm abuts the cam. When this happens however, further travel counterclockwise of the rocker plate is prevented. Thereafter, with further travel of the link to the right, the rocker pin 47 remains stationary and the right-hand end of the slot is pulled away from engagement with the rocker pin until the stroke of the link to the right is completed. As the reciprocating movement of the link reverses and again slides to the left, initial movement of the computer arm and the rocker plate awaits engagement of the right-hand end of the slot with the rocker pin. When this occurs, the rocker arm, computer arm and the input hub are locked together with the clutch sleeve 51 by the clutch rollers 50 and are rotated in a clockwise direction by the eccentric force applied through the rocker pin. This advances the register to indicate a measured volume corrected for temperature.

In accordance with the primary aim of the present invention, a novel support 29 is attached to the input hub 17 to keep the input hub from binding on the clutch sleeve 51 during the return stroke of the link 20. For this purpose, one end of the support is fixed to the input hub and a distal end 30 thereof is spaced axially outside of the plane of rotation of the input hub and includes an integral reaction surface 31 in bearing engagement with the outside of the clutch shaft 15. As a result, the side loading applied through the rocker pin 47 is kept from tilting the input hub in its rotational plane and causing the input clutch rollers 50 to prematurely grip the clutch sleeve 51 and introduce measuring inaccuracies. An additional virtue of the novel support 29 is that it enables the use of a lower strength return spring 66 than would otherwise be required to insure against premature roller gripping of the clutch sleeve. Advantageously, use of a lower force return spring directly reduces the amount of drag applied to the rotors of the meter 33 during overtravel of the rocker pin 47 within the slot 65 and is particularly effective in increasing the accuracy of the meter at low flow rates.

In the present instance, the clutch support 29 (see FIG. 3) consists of an elongated tubular bearing 67 with an integral flange 69 formed at one end thereof. The flange is bolted to the input clutch hub 17 with assembly screws 70 which pass through openings in the rocker plate 49. The flange 69 has a hole 73 (shown hidden in FIG. 2) through which passes the rocker pin 47. The tubular bearing 67 is concentric and perpendicular to the flange 69 and includes a central opening 74 therethrough sized to allow free rotation around the clutch shaft 15. The distal end 30 of the support comprises the end of the tubular bearing opposite the flange and the wall of the central opening is the integral reaction surface 31 providing support against tilting of the input hub 17 on the clutch sleeve 51.

In view of the foregoing, it will be appreciated that the present invention brings to the art a particularly simple yet highly effective arrangement for mounting the input clutch hub 17 so that when eccentric load (side loading) is applied the loading is resisted by the tubular bearing 67 and the clutch hub remains in alignment with its rotational plane. Because the input clutch hub is maintained in alignment, the front roller bearings 50 are kept from prematurely gripping the clutch sleeve 51 as the input clutch hub rotates counterclockwise.

I claim:

1. In a gas meter having a gear train with a rotor-powered shaft connected to a compensated meter counter assembly including a one-way clutch having a rear clutch hub supported against rotation and an input hub drivingly releasable and connectable to a clutch shaft for unidirectional rotation of said clutch shaft in response to a reciprocating force coupled eccentrically to said hub from outside of the rotational plane of said input hub for driving a register connected to said clutch shaft, the improvement comprising a support member fixedly connected to said input hub for movement therewith and extending along said clutch shaft, said support member having a distal end with an integral reaction surface spaced from the rotational plane of said hub and located in bearing engagement with said clutch shaft to react against tilting of said hub within its rotational plane and binding relative to said clutch shaft under said force.

2. A counter assembly for a fluid meter having an output shaft rotatable proportionally to the volume of fluid flow through the meter, said counter including a support plate, an input crank shaft supported adjacent said plate and drivingly connectable with said output shaft, a computer mechanism connected to said plate, and a readable register driven by said computer mechanism to provide corrected fluid flow volume information, said computer mechanism having a clutch shaft connected to said register and rotated proportionally to the corrected volume flow of fluid through said meter, a one-way clutch unit including a rear clutch hub supported against rotation and an input hub mounted on said clutch shaft rotatably within a plane to drivingly release from and connect with said clutch shaft for unidirectional rotation thereof, a crank connected to said crank shaft, a drive link with one end pivotally connected to said crank and an opposite end coupled to said input hub from outside the plane of rotation thereof and being reciprocally movable in response to rotation of said crank to reciprocally rotate said input hub, a computer arm pivotally connected to said input hub to swing back and forth through an adjustable length arc with reciprocal movement of said link, an adjustable stop connected to said input hub and engageable with said computer arm for angular adjustment of said arm relative to said input hub, a spring connected between said computer arm and said input hub and urging said computer arm against said adjustable stop, a condition responsive stop positionable in the arc of travel of said computer arm in response to changes relative to a preselected standard condition to limit the arc of travel of said arm relative to a standard length arc at said standard set condition, an overtravel spring-biased connection between said computer arm and said crank to compensate for the change of travel distance of said computer arm from its standard length of travel, and a support member fixedly connected to said input hub for movement therewith and extending along said clutch shaft, said support member having a distal end with an integral reaction surface spaced from the rotational plane of said input hub and located in bearing engagement with said clutch shaft to react against tilting of said hub within its rotational plane and binding relative to said clutch shaft when drivingly released therefrom.

3. A one-way clutch having a rear clutch hub supported against rotation and an input hub rotatable within a plane to drivingly release from and connect with a clutch shaft for unidirectional rotation of said clutch shaft in response to a bidirectional force coupled to said input hub from outside of the rotational plane thereof, and a support member fixedly connected to said input hub for movement therewith and extending along said clutch shaft, said support member having a distal end with an integral reaction surface spaced from the rotational plane of said hub and located in bearing engagement with said clutch shaft to react against tilting of said hub outside of its rotational plane and binding thereof relative to said clutch shaft under said force when drivingly released.

4. A counter assembly for a fluid meter having an output shaft rotatable proportionally to the volume of fluid flow through the meter, said counter including
   a support plate,
   an input crank shaft supported adjacent said plate and drivingly connectable with said output shaft,
   a computer mechanism connected to said plate, and a readable register driven by said computer mechanism to provide corrected fluid flow volume information,
   said computer mechanism having
      a clutch shaft connected to said register and rotated proportionally to the corrected volume flow of fluid through said meter,
      a one-way clutch unit including a rear clutch hub supported against rotation and an input hub mounted on said clutch shaft rotatably within a plane to drivingly release from and connect with said clutch shaft for unidirectional rotation thereof,
      a crank connected to said crank shaft,
      a drive link with one end pivotally connected to said crank and an opposite end coupled to said input hub from outside the plane of rotation thereof and being reciprocally movable in response to rotation of said crank to reciprocally rotate said input hub,
      a computer arm mounted on said input hub and carried thereby to swing back and forth through a variable length arc with reciprocal movement of said link,
      a condition responsive stop positionable in the arc of travel of said computer arm in response to changes relative to a preselected standard condition to limit the arc of travel of said arm relative to a standard length arc at said standard set condition,
      an overtravel spring-biased connected between said computer arm and said crank to compensate for the change of travel distance of said computer arm from its standard length of travel, and
      a support member fixedly connected to said input hub for movement therewith and extending along said clutch shaft, said support member having a distal end with an integral reaction surface spaced from the rotational plane of said input hub and located in bearing engagement with said clutch shaft to react against tilting of said hub within its rotational plane and binding relative to said clutch shaft when drivingly released therefrom.

* * * * *